(12) United States Patent
Ito et al.

(10) Patent No.: US 11,719,138 B2
(45) Date of Patent: Aug. 8, 2023

(54) SINTERED ALLOY VALVE GUIDE AND METHOD OF PRODUCING SINTERED ALLOY VALVE GUIDE

(71) Applicant: TPR Co., Ltd., Tokyo (JP)

(72) Inventors: Fumiya Ito, Tokyo (JP); Shohtaroh Hara, Tokyo (JP)

(73) Assignee: TPR Co., Ltd., Tokyo (JP)

( * ) Notice: Subject to any disclaimer, the term of this patent is extended or adjusted under 35 U.S.C. 154(b) by 0 days.

(21) Appl. No.: 17/922,613

(22) PCT Filed: Apr. 27, 2021

(86) PCT No.: PCT/JP2021/016775
§ 371 (c)(1),
(2) Date: Nov. 1, 2022

(87) PCT Pub. No.: WO2022/230046
PCT Pub. Date: Nov. 3, 2022

(65) Prior Publication Data
US 2023/0127085 A1    Apr. 27, 2023

(51) Int. Cl.
*F01L 3/08*    (2006.01)
*B22F 3/26*    (2006.01)
(Continued)

(52) U.S. Cl.
CPC .................. *F01L 3/08* (2013.01); *B22F 3/16* (2013.01); *B22F 3/26* (2013.01); *B22F 5/106* (2013.01);
(Continued)

(58) Field of Classification Search
CPC . F01L 3/08; F01L 2301/00; B22F 3/26; B22F 5/106; B22F 7/002; B22F 2003/247;
(Continued)

(56) References Cited

U.S. PATENT DOCUMENTS

| 6,012,703 A | 1/2000 | Hayashi et al. |
| 2006/0032328 A1 | 2/2006 | Chikahata et al. |

(Continued)

FOREIGN PATENT DOCUMENTS

| CN | 106121761 A | 11/2016 |
| CN | 111566366 A | 8/2020 |

(Continued)

OTHER PUBLICATIONS

Office Action, Notice of Reasons for Refusal in JP Application No. 2021-555239 dated Dec. 21, 2021, 6 pages.

(Continued)

*Primary Examiner* — Jacob M Amick
(74) *Attorney, Agent, or Firm* — Marshall, Gerstein & Borun LLP

(57) ABSTRACT

The present invention addresses the problem of providing a sintered alloy valve guide capable of inhibiting valve adhesion even in a high-temperature environment. The problem can be solved by a sintered alloy valve guide impregnated with a lubricating oil including pores that are sealed on the valve guide outer circumferential surface. More particularly, the problem is solved by the sealing step of performing a sealing treatment of pores on the outer circumferential surface of a sintered body impregnated with a lubricating oil.

9 Claims, 7 Drawing Sheets

(51) Int. Cl.
*B22F 5/10* (2006.01)
*B22F 7/00* (2006.01)
*B22F 3/16* (2006.01)
*B22F 3/24* (2006.01)

(52) U.S. Cl.
CPC ........ *B22F 7/002* (2013.01); *B22F 2003/247* (2013.01); *B22F 2201/02* (2013.01); *B22F 2201/20* (2013.01); *B22F 2301/10* (2013.01); *B22F 2301/35* (2013.01); *B22F 2302/40* (2013.01); *B22F 2998/10* (2013.01); *F01L 2301/00* (2020.05)

(58) Field of Classification Search
CPC .............. B22F 2201/02; B22F 2201/20; B22F 2301/10; B22F 2301/35; B22F 2302/40; B22F 2998/10
See application file for complete search history.

(56) References Cited

U.S. PATENT DOCUMENTS

| | | | |
|---|---|---|---|
| 2016/0312668 A1 | 10/2016 | Hunsche et al. | |
| 2018/0171836 A1 | 6/2018 | Hunsche et al. | |
| 2020/0325934 A1 | 10/2020 | Kouno et al. | |
| 2020/0391288 A1* | 12/2020 | Fukae | F01L 3/08 |

FOREIGN PATENT DOCUMENTS

| | | |
|---|---|---|
| DE | 19729417 B4 | 11/2006 |
| DE | 102009052302 A1 | 5/2011 |
| GB | 780073 A | 7/1957 |
| JP | S54173117 U | 12/1979 |
| JP | H08-232619 A | 9/1996 |
| JP | 2006-052468 A | 2/2006 |
| JP | 2017-508909 A | 3/2017 |
| JP | 7122480 B1 | 8/2022 |
| WO | WO-2005/031127 A1 | 4/2005 |
| WO | WO-2016/202525 A1 | 12/2016 |

OTHER PUBLICATIONS

Decision of Refusal in JP Application No. 2021-555239 dated Apr. 19, 2022, 8 pages.
Decision to Grant a Patent in JP Application No. 2021-555239 dated Jul. 5, 2022, 5 pages.
Search Report and Written Opinion in International Application No. PCT/JP2021/016775 dated Jul. 13, 2021, 8 pages.
Office Action in CN Application No. 202210456074.0 dated Jan. 20, 2023, 7 pages.
Extended European Search Report for Application No. 21937219.0, dated Jun. 19, 2023.

* cited by examiner

SINTERED ALLOY VALVE GUIDE AND METHOD OF PRODUCING SINTERED ALLOY VALVE GUIDE

TECHNICAL FIELD

The present invention relates to: a sintered alloy valve guide used in an internal combustion engine; and a method of producing the same.

BACKGROUND ART

In recent automobile gasoline engines, for lower fuel consumption, lower emissions, and higher output, the combustion efficiency is improved by a combination of various technologies such as downsizing and direct-injection supercharging. An improvement in the combustion efficiency means reduction of various losses. Particularly, the exhaust loss having a high loss ratio has been drawing attention, and it has been attempted to increase the compression ratio as a technology for reducing the exhaust loss.

On the other hand, an increase in the compression ratio inevitably causes an increase in the engine temperature and, particularly, in the vicinity of exhaust valves where the surrounding temperature is high, a lubricating oil impregnated into valve guides for inhibition of adhesion with the valves leaks out to the exhaust gas side and generates white smoke, as a result of which the amount of the impregnated lubricating oil is reduced. This leads to insufficient lubrication, causing valve adhesion.

With regard to this problem, Patent Document 1 proposes a sintered alloy-made valve guide for internal combustion engines, in which the density and the powder grain size of the sintered alloy are adjusted to control the air permeability in a specific range, and a silicone resin is impregnated into pores to attain excellent wear resistance and seizure resistance and to reduce the discharge of an impregnated lubricating oil.

RELATED ART DOCUMENT

Patent Document

[Patent Document 1] Japanese Patent No. 3573817

SUMMARY OF THE INVENTION

Problems to be Solved by the Invention

However, in the method proposed in Patent Document 1, valve adhesion may occur to cause abnormal wear when the amount of the lubricating oil is reduced in a high-temperature environment. An object of the present invention is to provide a sintered alloy valve guide capable of inhibiting valve adhesion even in a high-temperature environment.

Means for Solving the Problems

In order to solve the above-described problem, the present inventors intensively studied the means by which a lubricating oil can be retained even when exposed to a high temperature, and consequently discovered that the above-described problem can be solved by performing a sealing treatment of pores on the outer circumferential surface of a valve guide in a state where the valve guide retains the lubricating oil.

One mode of the present invention is a sintered alloy valve guide impregnated with a lubricating oil including pores that are sealed on the valve guide outer circumferential surface.

On the valve guide outer circumferential surface, the pores are preferably sealed over the entire surface, and the pores of a side arranged on the combustion chamber side in the lengthwise direction are preferably sealed. On end surfaces of the valve guide, it is preferred that pores of the end surface arranged on the combustion chamber side be sealed.

Further, when a cross-section of the valve guide is observed, the number of pores that have a depth of at least 20 μm and are open in a length of at least 20 μm on the outer circumferential surface is preferably 18 or less in a 30 mm-long range of a portion that corresponds to the outer circumferential surface having sealed pores at the cross-section.

Still further, the valve guide prior to being impregnated with the lubricating oil preferably has a density of 6.55 g/cm$^3$ to 7.15 g/cm$^3$.

Another mode of the present invention is a method of producing a sintered alloy valve guide, the method including: the molding step of molding a raw material powder to obtain a molded body; the sintering step of sintering the molded body; the impregnation step of impregnating a lubricating oil into the sintered body obtained in the previous step; and the sealing step of performing a sealing treatment of pores on the outer circumferential surface of the sintered body impregnated with the lubricating oil.

In the impregnation step, it is preferred that the lubricating oil be impregnated into the sintered body under reduced pressure.

Further, on the valve guide outer circumferential surface, the pores are preferably sealed over the entire surface, and the pores of a side arranged on the combustion chamber side in the lengthwise direction are preferably sealed. On end surfaces of the valve guide, it is preferred that pores of the end surface arranged on the combustion chamber side be sealed.

The sealing step preferably includes any one of a shot blasting process, a crushing process by burnishing, a resin impregnation process, a plating process, and a steam process.

Effects of the Invention

According to the present invention, a sintered alloy valve guide capable of inhibiting valve adhesion even in a high-temperature environment can be provided. Since abnormal wear of the valve guide inner circumferential surface caused by valve adhesion can be inhibited, a valve guide having a high wear resistance can be provided.

MODE FOR CARRYING OUT THE INVENTION

Figure 1:
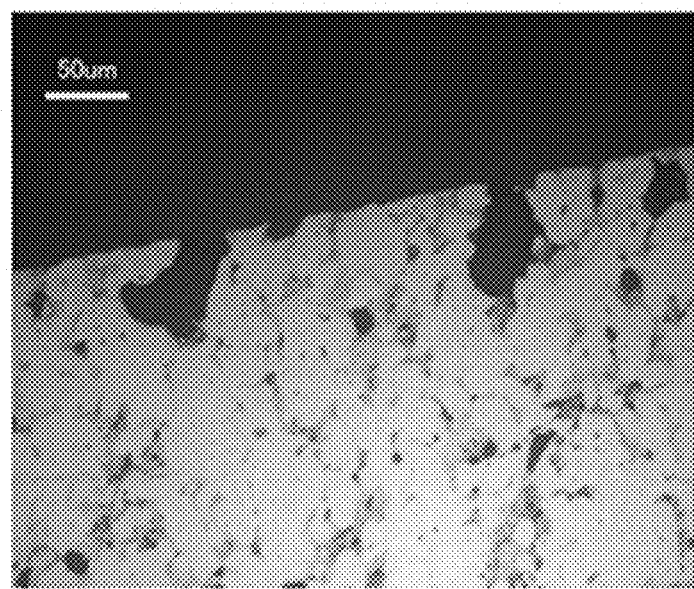
FIG. 1 is a cross-sectional image (drawing substitute) of the vicinity of the outer circumferential surface of Conventional Example.

One embodiment of the present invention is a sintered alloy valve guide impregnated with a lubricating oil including pores that are sealed on the valve guide outer circumferential surface.

The valve guide according to the present embodiment is preferably formed of an iron-based sintered alloy and, in the case of being formed of an iron-based sintered alloy, the valve guide may also contain other metal component, such as Cu, Ca, Zn, Ni, Cr, V, or W, in addition to Fe contained as a main component. In the valve guide, Fe as a main component is usually contained in an amount of 50% by mass or more, and the amount may be 60% by mass or more, 70% by mass or more, or 80% by mass or more. In the valve guide, a metal component other than Fe is usually contained in an amount of less than 50% by mass, and the amount may be 30% by mass or less, or 20% by mass or less.

When the valve guide contains other metal component, the valve guide preferably contains Cu. The content of Cu is usually 5% by mass or more and may be 10% by mass or more, but it is usually 40% by mass or less and may be 30% by mass or less.

It is noted here, however, that the valve guide according to the present embodiment is not limited to the above-described composition, and may be formed of any sintered alloy as long as it has pores on the outer circumferential surface. In addition, the valve guide according to the present embodiment is not limited to being formed of an iron-based sintered alloy, and may be formed of a Cu-based sintered alloy that contains Cu as a main component.

Further, the valve guide according to the present embodiment is not limited to being formed of a sintered alloy and may be formed of any alloy material as long as a lubricating oil can be impregnated thereinto.

The valve guide may further contain a solid lubricant and/or a mold release agent. As the solid lubricant, any known solid lubricant can be used, and examples thereof include $MoS_2$. As the mold release agent, any known mold release agent can be used, and examples thereof include zinc stearate. When the valve guide contains a solid lubricant and/or a mold release agent, the content thereof is usually 0.05% by mass or more, but usually 5% by mass or less, preferably 3% by mass or less.

The valve guide has pores on the outer circumferential surface. The valve guide generally has a cylindrical shape with an outer circumferential surface, end surfaces, and an inner circumferential surface. In the present embodiment, the valve guide has pores at least on the outer circumferential surface.

In the present embodiment, the valve guide is impregnated with a lubricating oil. The density of the valve guide prior to being impregnated with the lubricating oil is not particularly limited; however, it is preferably 6.55 $g/cm^3$ to 7.15 $g/cm^3$. When the density of the valve guide is in this range, the valve guide is likely to have an appropriate amount of pores.

As a method of controlling the density of the valve guide to be in the above-described range, for example, the raw material pressing pressure may be adjusted as appropriate at the time of molding a raw material powder of the valve guide, or the grain size of the raw material powder may be selected as appropriate.

By controlling the amount of the pores of the valve guide prior to being impregnated with the lubricating oil to be an appropriate level, the valve guide is enabled to retain a sufficient amount of the lubricating oil even in a high-temperature environment. As a result, a sintered alloy valve guide capable of inhibiting valve adhesion even in a high-temperature environment can be provided. In addition, since abnormal wear of the valve guide inner circumferential surface caused by valve adhesion can be inhibited, a valve guide having a high wear resistance can be provided.

The lubricating oil to be impregnated into the valve guide of the present embodiment is not particularly limited as long as it can be retained in the valve guide. Examples of the lubricating oil include 15W-40, 10W-30, and 0W-20.

The viscosity of the lubricating oil is also not particularly limited; however, from the standpoint of improving the retainability of the lubricating oil, the lubricating oil preferably has a high viscosity to a certain extent.

In the valve guide of the present embodiment that is impregnated with the lubricating oil, the pores of the valve guide outer circumferential surface are sealed. The term "sealed" used herein refers to that, as compared to an unsealed state, the number of the pores that are open is reduced by a sealing treatment performed on the valve guide outer circumferential surface. The number of the pores that are open (hereinafter, also referred to as "the number of open pores") can be measured by the following method.

A cross-sectional shape of the valve guide in a plane parallel to the axial direction is observed under a light microscope and, at this cross-section, a portion of the valve guide outer circumferential surface that has been subjected to a sealing treatment is observed over a length of 30 mm. This length of 30 mm may be of a single continuous spot, or may be a total length of several separate spots. Among the pores that are open in the portion of the outer circumferential surface that has been subjected to a sealing treatment, the number of pores that have a depth of at least 20 μm and are open in a length of at least 20 μm on the outer circumferential surface is counted, and the thus obtained value is defined as the number of open pores.

The number of open pores on the outer circumferential surface of the valve guide impregnated with the lubricating oil and subjected to a sealing treatment is preferably 18 or less, more preferably 15 or less, particularly preferably 10 or less, per 30 mm. This number of open pores may be satisfied in at least one arbitrary position of the portion of the valve guide outer circumferential surface that has been subjected to a sealing treatment, and the above-described number of open pores does not necessarily have to be satisfied in the entirety of the seal-treated portion; however, it is preferred that the above-described number of open pores be satisfied in the entirety of the seal-treated portion.

The valve guide outer circumferential surface impregnated with the lubricating oil may be entirely seal-treated, or may be partially seal-treated.

When the valve guide outer circumferential surface is partially seal-treated, the pores of the outer circumferential surface on a side arranged on the combustion chamber side in the lengthwise direction of the valve guide may be sealed and, specifically, it is preferred that a boundary between a seal-treated spot and a non-seal-treated spot be in a range of 4% to 30% from the side arranged on the combustion chamber side in the lengthwise direction of the valve guide.

Further, the pores on the valve guide end surfaces may or may not be subjected to a sealing treatment. When the pores on the valve guide end surfaces are subjected to a sealing treatment, it is preferred that at least the pores of the end surface on the side arranged on the combustion chamber side be sealed.

Next, a method of producing a valve guide impregnated with a lubricating oil will be described.

Another mode of the present invention is a method of producing a sintered alloy valve guide, the method including: the molding step of molding a raw material powder to obtain a molded body; the sintering step of sintering the molded body; the impregnation step of impregnating a lubricating oil into the sintered body obtained in the previous step; and the sealing step of performing a sealing treatment of pores on the surface of the sintered body impregnated with the lubricating oil.

<Molding Step>

When the sintered body is formed of, for example, an iron-based sintered alloy, as the raw material powder used in the molding step, a Cu powder, a Fe alloy powder, a Cu alloy powder or the like can be used in addition to a pure Fe powder serving as a core. Further, for example, a powder containing Ca, Zn, Ni, Cr, V, or W may be used, and a solid lubricant and a mold release agent may be used as well.

A mixing ratio of these powders is not particularly limited as long as it is in a range that allows the resulting sintered body to be used as a valve guide.

The average grain size of the raw material powder is not particularly limited; however, it is usually about 10 to 150 μm. By using a raw material powder having an average grain size in this range, the density of the sintered body is likely to be in an appropriate range, which is preferred.

A molding method is also not particularly limited and, for example, the raw material powder may be filled into a mold and molded by a press molding method or the like such that the density of the resulting molded body is in an appropriate range.

<Sintering Step>

In the sintering step, the thus obtained molded body is sintered. The sintering temperature is not particularly limited as long as the raw material powder can be sintered to obtain a sintered body, and it is, for example, 1,102 to 1,152° C. The atmosphere during the sintering is preferably vacuum, or an inert gas atmosphere of a nitrogen gas, an argon gas or the like.

The sintering time is also not particularly limited, and it is, for example, 10 minutes to 2 hours, preferably 15 minutes to 1 hour.

<Impregnation Step>

The impregnation step is the step of impregnating a lubricating oil into the sintered body obtained in the above-described step. The lubricating oil to be impregnated is not particularly limited as long as it can be retained in the resulting valve guide. The lubricating oil is, for example, 10W-30.

The viscosity of the lubricating oil is also not particularly limited, and may be 2.6 cp to 3.6 cp at 150° C. From the standpoint of improving the retainability of the lubricating oil, the lubricating oil preferably has a high viscosity to a certain extent.

A method of impregnating the lubricating oil into the valve guide is not particularly limited, and the valve guide may be dipped into the lubricating oil, or the lubricating oil may be applied dropwise to the valve guide. As one example, a method of applying the lubricating oil dropwise to the valve guide, allowing the lubricating oil to impregnate into the valve guide while maintaining a hermetically sealed state, and subsequently releasing the reduced pressure may be employed.

<Sealing Step>

The sealing step is the step of performing a sealing treatment of the pores on the outer circumferential surface of the sintered body impregnated with the lubricating oil. By performing the sealing step, the ratio of open pores on the valve guide outer circumferential surface is reduced, so that the valve guide can retain a sufficient amount of the lubricating oil even in a high-temperature environment. As a result, a sintered alloy valve guide capable of inhibiting valve adhesion even in a high-temperature environment can be provided. In addition, since abnormal wear of the valve guide inner circumferential surface caused by valve adhesion can be inhibited, a valve guide having a high wear resistance can be provided.

The sealing treatment is not particularly limited as long as it is a treatment that can reduce the ratio of open pores (the number of open pores) on the valve guide outer circumferential surface. Examples of the sealing treatment include a shot blasting process, a crushing process by burnishing, a resin impregnation process, a plating process, and a steam process.

When the sealing treatment is performed by a shot blasting process, for example, the blasting process is preferably performed for several seconds to several minutes using shot balls made of steel or zircon.

When the sealing treatment is performed by a crushing process by burnishing, for example, the valve guide surface is preferably processed by roller burnishing.

When the sealing treatment is performed by a resin impregnation process, for example, impregnation is preferably performed using an oil-resistant and wear-resistant resin such as TEFLON (registered trademark).

When the sealing treatment is performed by a plating process, for example, pores are preferably sealed by plating the valve guide outer circumferential surface with copper.

When the sealing treatment is performed by a steam process, for example, the sealing treatment is preferably performed with an iron oxide mainly composed of triiron tetraoxide ($Fe_3O_4$) formed by a steam process after impregnation. Specifically, reference can be made to Japanese Unexamined Utility Model Application No. S54-173117.

In the present embodiment, a step other than the above-described steps (other step) may be incorporated as appropriate. Examples of the other step include the step of polishing the outer circumferential surface.

EXAMPLES

The present invention will now be described in more detail by way of Experimental Examples; however, the present invention is not limited by the results of the below-described Experimental Examples.

<Change in Oil Content Ratio of Valve Guide Due to Sealing Treatment>

The followings were used as raw material powders.
Fe powder (average grain size: 106 to 150 μm)
Cu powder (average grain size: 45 μm or smaller)
C powder (average grain size: 50 μm or smaller)
Other powders (e.g., solid lubricant, mold release agent)

These powders were mixed and compressed to obtain a cylindrical molded body of 10.5 mm in outer diameter, 5.0 mm in inner diameter, and 45.5 mm in length. The thus obtained molded body had a density of 6.85 g/cm³. Next, this molded body was sintered in a nitrogen gas atmosphere at 1,127° C. for 30 minutes to obtain a sintered body. The thus obtained sintered body was subsequently cut to obtain a valve guide 1 of 10.3 mm in outer diameter, 5.5 mm in inner diameter, and 43.5 mm in length.

The valve guide 1 was impregnated with an engine oil having a viscosity of 10W-30. The impregnation conditions were as follows.

Oil temperature: 80° C.
The degree of vacuum was adjusted to be in a range of 0.06 to 0.1 MPa.
The vacuuming time and the oil impregnation time were each adjusted to be in a range of 5 minutes to 20 minutes.

Subsequently, the outer circumferential surface and the end surfaces of the valve guide 1 impregnated with the lubricating oil were subjected to a sealing treatment by shot blasting under the following conditions to obtain a valve guide 2.

Figure 2:
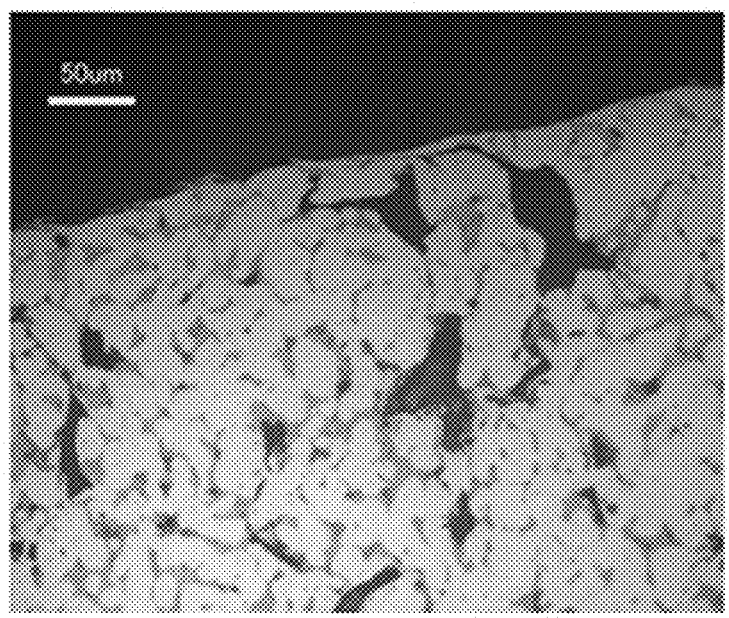
FIG. 2 is a cross-sectional image (drawing substitute) of the vicinity of the outer circumferential surface of Example.

Equipment: manufactured by Fuji Manufacturing Co., Ltd.
Shot blasting time: 15 seconds FIG. 1 shows open pores existing on the outer circumferential surface of the valve guide 1 at a cross-section parallel to the axial direction. Further, FIG. 2 shows open pores existing on the outer circumferential surface of the valve guide 2 at a cross-section parallel to the axial direction.

For the valve guide 1 (Conventional Example) and the valve guide 2 (Example), a heating test was conducted at 200° C.±10° C. to check the change in oil content ratio based on the heating time. The results thereof are shown in FIG. 3.

Figure 3:
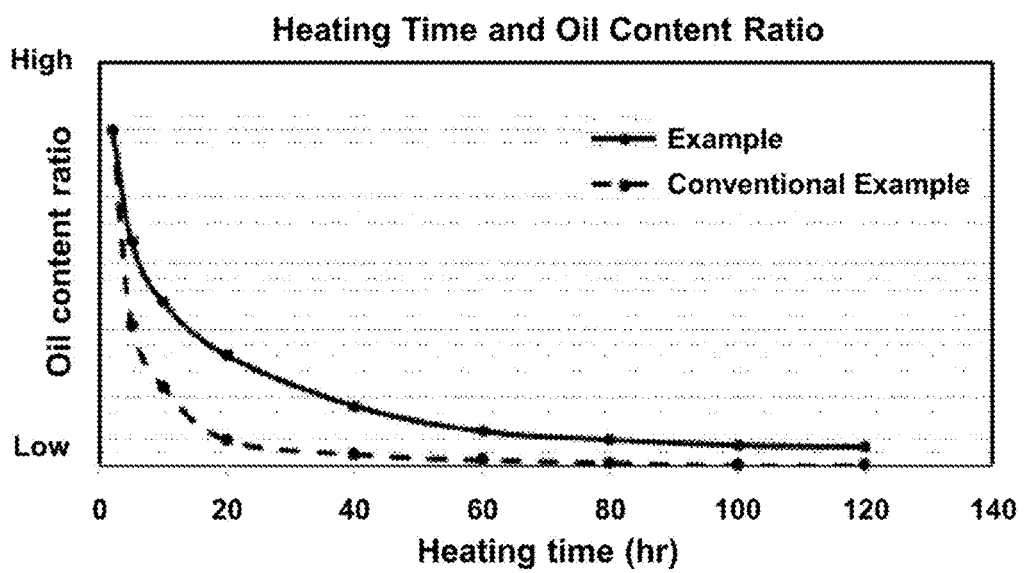
FIG. 3 is a graph showing the relationship between the heating time and the oil content ratio in Conventional Example and Example.

From FIG. 3, it was found that the oil content ratio decreased with the heating time, and that the amount of the decrease in the oil content ratio with respect to the heating time was reduced in the valve guide 2 subjected to the sealing treatment.

<Change in Amount of Wear of Valve Guide Inner Circumferential Surface Due to Sealing Treatment>

Figure 4:
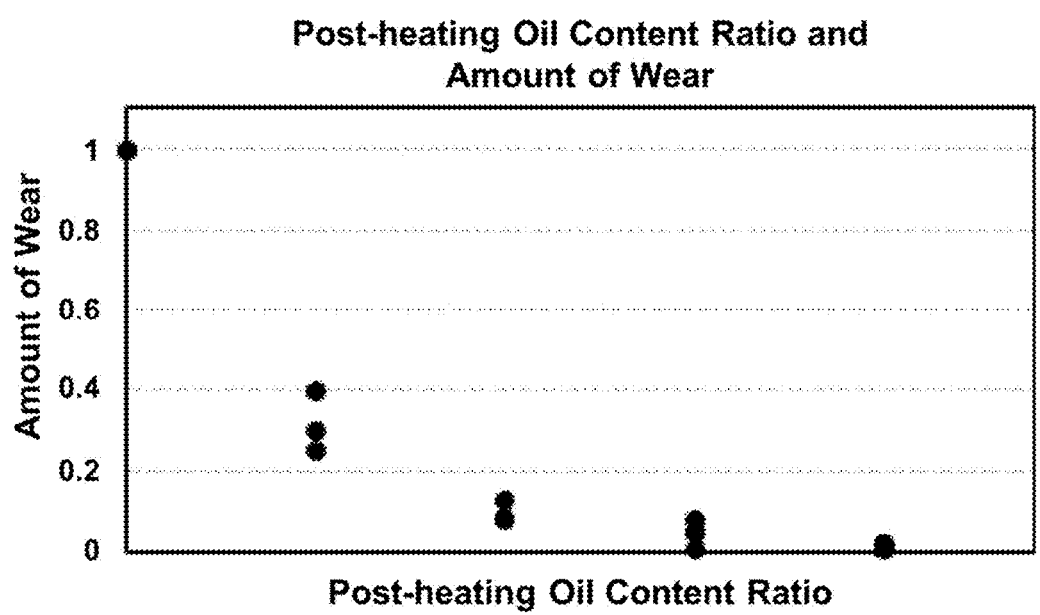
FIG. 4 is a graph showing the relationship between the post-heating oil content ratio and the amount of wear in Conventional Example and Example.

The valve guides 1 and 2 were each heated at the above-described temperature for varying heating time to prepare five samples having different values of post-heating oil content ratio, and the samples were subjected to a simple wear test under the following conditions. The results thereof are shown in FIG. 4.

Figure 7:
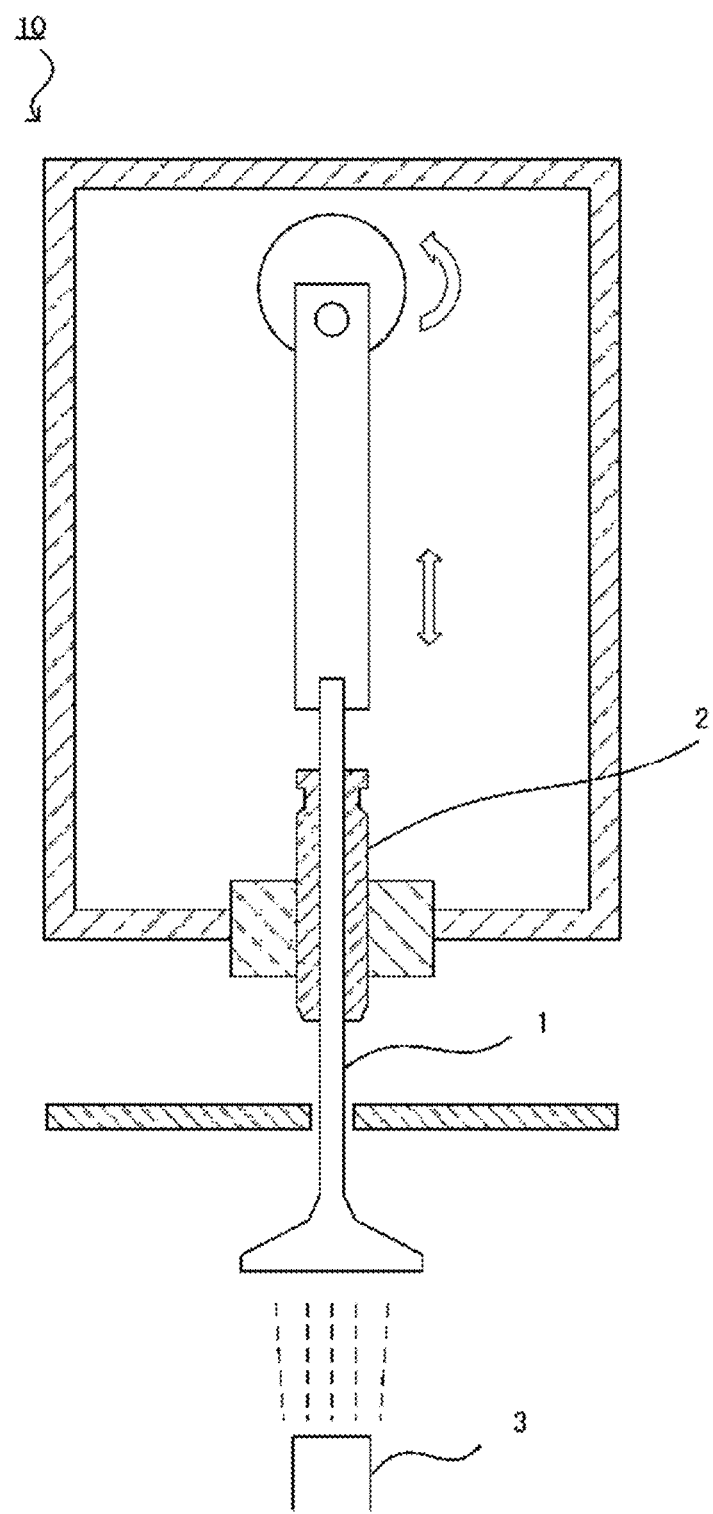
FIG. 7 is a schematic drawing that illustrates the structure of a valve guide simple wear tester.

Tester: the structure of the tester is shown in FIG. 7.
Guide temperature: 300° C.
Side pressure: 7 kg
Rotation speed: 3,500 rpm
The amount of oil added dropwise (degraded oil) was adjusted as appropriate.
Test time: 4 hours From the results shown in FIG. 4, it was found that a higher post-heating oil content ratio resulted in a smaller amount of wear. Therefore, it was found that the oil retention performance of a valve guide impregnated with a lubricating oil is improved by performing a sealing treatment on the valve guide, and that the amount of wear of the valve guide inner circumferential surface is reduced as a result.

<Relationship Between Number of Open Pores and Post-Heating Oil Content Ratio>

Figure 5:
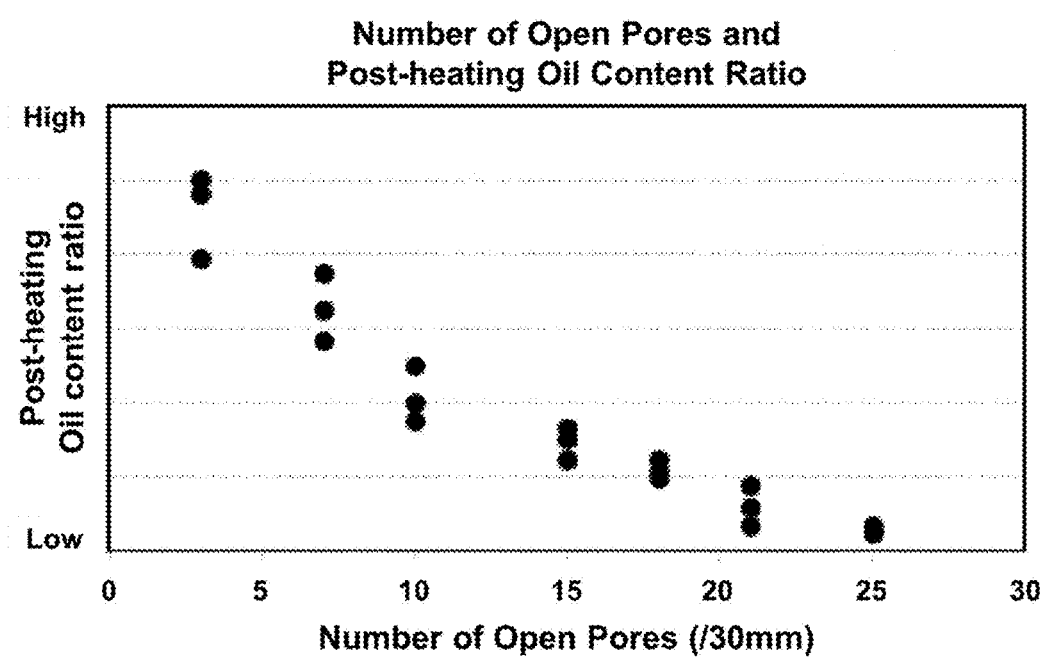
FIG. 5 is a graph showing the relationship between the number of open pores and the post-heating oil content ratio in Conventional Example and Example.

The conditions of the sealing treatment and the number of open pores were modified for the valve guide 1 to prepare samples of the valve guide 2. The sealing treatment was performed by shot blasting, and the samples were prepared with varying shot blasting time. The number of open pores was measured for each of the samples, and the samples were subsequently heated at 200° C.±10° C. for 20 hours, after which the post-heating oil content ratio was measured. The results thereof are shown in FIG. 5. It was observed that a smaller number of open pores tended to result in a higher post-heating oil content ratio.

It is noted here that the number of open pores of the sample which was not subjected to the sealing treatment (valve guide 1: Conventional Example) was 25/30 mm.

<Relationship Between Number of Open Pores and Amount of Wear>

Figure 6:
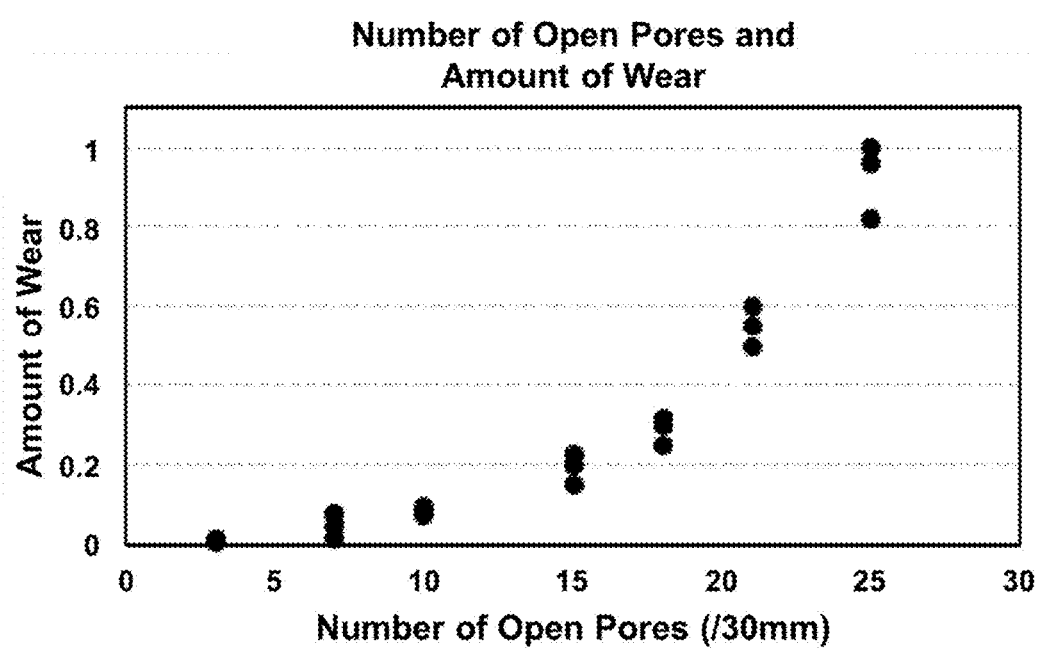
FIG. 6 is a graph showing the relationship between the number of open pores and the amount of wear in Conventional Example and Example.

Next, a simple wear test was conducted for the samples that were subjected to a sealing treatment under the same conditions as described above. The results thereof are shown in FIG. 6. A longer shot blasting time resulted in a smaller number of open pores and a smaller amount of wear.

From the above, it was found that a sintered alloy valve guide capable of inhibiting abnormal wear of the valve guide inner circumferential surface even in a high-temperature environment can be provided by performing a sealing treatment to control the number of open pores in a prescribed range.

DESCRIPTION OF SYMBOLS

10: valve guide simple wear tester
1: valve
2: valve guide
3: burner

The invention claimed is:

1. A sintered alloy valve guide impregnated with a lubricating oil, comprising pores of a side arranged on a combustion chamber side in a lengthwise direction that are sealed on a valve guide outer circumferential surface,
wherein the valve guide is formed from a single material, and
when a cross-section of the valve guide is observed, a number of pores that have a depth of at least 20 μm and are open in a length of at least 20 μm on an outer circumferential surface is 18 or less in a 30 mm-long range of a portion that corresponds to the outer circumferential surface having sealed pores at the cross-section.

2. The valve guide according to claim 1, wherein the pores are sealed over the entirety of the valve guide outer circumferential surface.

3. The valve guide according to claim 1 wherein, on end surfaces of the valve guide, at least pores of the end surface arranged on the combustion chamber side are sealed.

4. The valve guide according to claim 1, wherein the valve guide prior to being impregnated with the lubricating oil has a density of 6.55 g/cm³ to 7.15 g/cm³.

5. A method of producing a sintered alloy valve guide, the method comprising:
a molding step of molding a raw material powder to obtain a molded body;
a sintering step of sintering the molded body to obtain a sintered body;
an impregnation step of impregnating a lubricating oil into the sintered body obtained in the previous step; and
a sealing step of performing a sealing treatment of pores on an outer circumferential surface of the sintered body impregnated with the lubricating oil,
wherein, when a cross-section of the valve guide is observed, a number of pores that have a depth of at least 20 μm and are open in a length of at least 20 μm on the outer circumferential surface is 18 or less in a 30 mm-long range of a portion that corresponds to the outer circumferential surface having sealed pores at the cross-section, and on the valve guide outer circumference surface, the pores of a side arranged on a combustion chamber side in the lengthwise direction are sealed.

6. The method according to claim 5, wherein, in the impregnation step, the lubricating oil is impregnated into the sintered body under reduced pressure.

7. The method according to claim 5, wherein the pores are sealed over an entirety of the valve guide outer circumferential surface.

8. The method according to claim 5, wherein on end surfaces of the valve guide, pores of an end surface arranged on the combustion chamber side are sealed.

9. The method according to claim 5, wherein the sealing step comprises at least one selected from a shot blasting process, a crushing process by burnishing, a resin impregnation process, a plating process, and a steam process.

* * * * *